(12) United States Patent
Tang et al.

(10) Patent No.: US 11,894,878 B2
(45) Date of Patent: Feb. 6, 2024

(54) METHOD FOR ELECTROMAGNETIC INTERFERENCE CONTROL, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Kai Tang, Guangdong (CN); Zhengpeng Tan, Guangdong (CN); Yun Chen, Guangdong (CN); Lizhong Wang, Guangdong (CN); Hai Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 448 days.

(21) Appl. No.: 17/243,416

(22) Filed: Apr. 28, 2021

(65) Prior Publication Data

US 2021/0250104 A1    Aug. 12, 2021

Related U.S. Application Data (63) Continuation of application No. PCT/CN2019/109069, filed on Sep. 29, 2019.

(30) Foreign Application Priority Data

Oct. 31, 2018 (CN) .......................... 201811289366.X (51) Int. Cl.
H04B 15/02 (2006.01)
H04W 72/0453 (2023.01)
H04W 72/541 (2023.01)

(52) U.S. Cl.
CPC ........ *H04B 15/02* (2013.01); *H04W 72/0453* (2013.01); *H04W 72/541* (2023.01)

(58) Field of Classification Search
CPC ....... G09G 2330/06; G09G 2340/0435; G09G 2370/10; G09G 3/2096; G09G 5/006; H04B 15/02; H04W 72/0453; H04W 72/541
See application file for complete search history.

(56) References Cited

U.S. PATENT DOCUMENTS

2007/0224940 A1    9/2007 Pankinaho et al.
2017/0118759 A1 *  4/2017 Choi ................. H04W 72/0453
(Continued)

FOREIGN PATENT DOCUMENTS

CN    103944657 A    7/2014
CN    103974267 A    8/2014
(Continued)

OTHER PUBLICATIONS

Communication pursuant to Rule 164(1) EPC for EP Application 19880114.4 dated Oct. 19, 2021. (16 pages).
(Continued)

*Primary Examiner* — Nguyen T Vo
(74) *Attorney, Agent, or Firm* — Young Basile Hanlon & MacFarlane, P.C.

(57) ABSTRACT

A method for electromagnetic interference control, an electronic device, and a storage medium are provided. A target operating frequency of a modem is obtained, in condition of a display screen being in a screen-on state, in response to an electronic device being in a call state. A first mobile industry processor interface (MIPI) operating frequency of an MIPI of the display screen is obtained. A second MIPI operating frequency corresponding to the call state is determined in response to determining the target operating frequency being interfered based on the first MIPI operating frequency. An MIPI operating frequency of the display screen is adjusted to the second MIPI operating frequency.

18 Claims, 4 Drawing Sheets

(56) References Cited

U.S. PATENT DOCUMENTS

2017/0208219 A1   7/2017  Lee et al.
2018/0234191 A1*  8/2018  Zhuang ............... H04W 52/027
2021/0165441 A1*  6/2021  Kim ......................... G06F 1/08

FOREIGN PATENT DOCUMENTS

| | | |
|---|---|---|
| CN | 104022543 A | 9/2014 |
| CN | 105827775 A | 8/2016 |
| CN | 105871478 A | 8/2016 |
| CN | 106160759 A | 11/2016 |
| CN | 106385716 A | 2/2017 |
| CN | 106936515 A | 7/2017 |
| CN | 107947894 A | 4/2018 |
| CN | 108063646 A | 5/2018 |
| CN | 108600949 A | 9/2018 |
| CN | 109348055 A | 2/2019 |
| CN | 109561643 A | 4/2019 |
| WO | 2018205829 A1 | 11/2018 |

OTHER PUBLICATIONS

Extended European Search Report for EP Application 19880114.4 dated Feb. 23, 2022. (18 pages).
ISR with English Translation issued in corresponding international application No. PCT/CN2019/109069 dated Dec. 27, 2019.
OA1 with English Translation issued in corresponding CN application No. 201811289366.X dated Nov. 14, 2019.
OA2 with English Translation issued in corresponding CN application No. 201811289366.X dated Mar. 23, 2020.
NOA with English Translation issued in corresponding CN application No. 201811289366.X dated Jul. 15, 2020.

\* cited by examiner

METHOD FOR ELECTROMAGNETIC INTERFERENCE CONTROL, ELECTRONIC DEVICE, AND STORAGE MEDIUM

CROSS-REFERENCE TO RELATED APPLICATION(S)

This application is a continuation of International Application No. PCT/CN2019/109069, filed on Sep. 29, 2019, which claims priority to Chinese Patent Application No. 201811289366.X, filed on Oct. 31, 2018, the entire disclosures of both of which are hereby incorporated by reference.

TECHNICAL FIELD

This disclosure relates to the technical filed of electronics, and particularly to a method for electromagnetic interference control, an electronic device, and a storage medium.

BACKGROUND

With the development of mobile communication technology, users have increasing demands on communication with electronic devices such as mobile phones. Currently, electronic devices on the market generally transmit data through cellular mobile network communications or Wi-Fi communications. However, full-screen mobile phones are facing problems like radio frequency interference. When a mobile industry processor interface (MIPI) of a display screen used to transmit data is operating at a fixed frequency, if its frequency division or frequency multiplication falls at a specific operating frequency, in the electronic device, there may be various modules that interfere with the MIPI of the display screen, for example, communication modules, audio modules, which may affect functional stability of various modules.

At present, hardware upgrades can improve interference to various modules, but cost is increased and improvement effect is limited. Therefore, how to reduce the interference of the operating frequency of the MIPI of the display screen to various modules in the electronic device is a problem to be solved.

SUMMARY

According to a first aspect, a method for electromagnetic interference control is provided. The method is for an electronic device. The electronic device includes a display screen and a modem. The method includes the following.

A target operating frequency of the modem is obtained, in condition of the display screen being in a screen-on state, in response to the electronic device being in a call state. A first mobile industry processor interface (MIPI) operating frequency of an MIPI of the display screen is obtained. A second MIPI operating frequency corresponding to the call state is determined in response to determining the target operating frequency being interfered based on the first MIPI operating frequency, where interference of the second MIPI operating frequency to the target operating frequency is less than interference of the first MIPI operating frequency to the target operating frequency. An MIPI operating frequency of the display screen is adjusted to the second MIPI operating frequency.

According to a second aspect, an electronic device is provided. The electronic device includes at least one processor and a memory. The memory is coupled to the at least one processor and stores at least one computer executable instruction thereon which, when executed by the at least one processor, causes the at least one processor to execute the method of the first aspect.

According to a third aspect, a non-transitory computer readable storage medium is provided. The non-transitory computer readable storage medium is configured to store a computer program which, when executed by a processor, causes the processor to execute the method of the first aspect.

BRIEF DESCRIPTION OF DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in implementations of the present disclosure will be described clearly and completely hereinafter with reference to the accompanying drawings described. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices, in-vehicle devices, wireless headsets, computing devices that have wireless communication functions or other processing devices connected to the wireless modem, as well as various forms of user equipment (UE), mobile stations (MS), terminal devices, and the like. The electronic device can be, for example, a smart phone, a tablet computer, a headset box, and so on. For the convenience of description, the above-mentioned devices are collectively referred to as an electronic device.

Figure 1A:
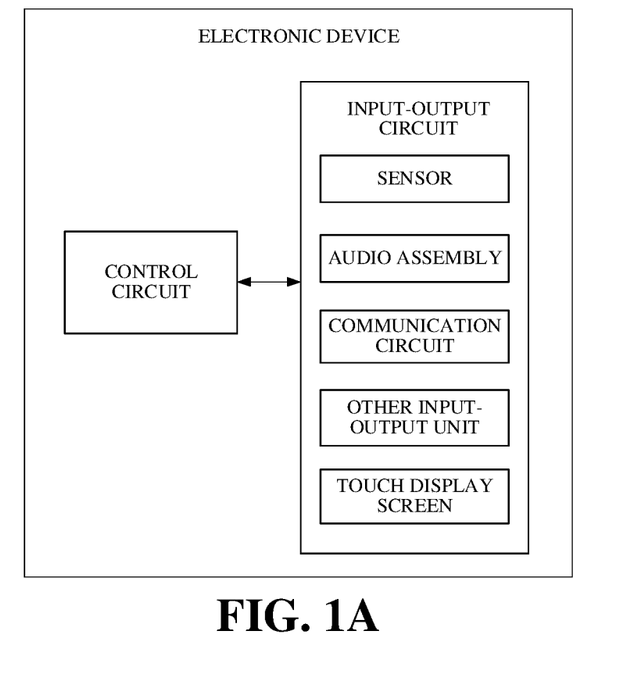
FIG. 1A is a schematic structural diagram illustrating an electronic device according to implementations.

FIG. 1A is a schematic structural diagram illustrating an electronic device according to implementations. As illustrated in FIG. 1A, the electronic device includes a control circuit and an input-output circuit. The input-output circuit is coupled with the control circuit.

The control circuit can include a store-and-process circuit. The store-and-process circuit has a storing circuit which may be a memory, such as a hard drive memory, a non-transitory memory (such as a flash memory, other electronically programmable read-only memories used to form a solid-state drive, or the like), a transitory memory (such as a static random access memory, a dynamic random access memory, or the like), or the like, and the disclosure is not limited in this regard. The store-and-process circuit has a processing circuit to control operations of the electronic device. The processing circuit can be implemented based on one or more microprocessors, microcontrollers, digital signal processors, baseband processors, power management units, audio codec chips, application-specific integrated circuits, display driver integrated circuits, or the like.

The store-and-process circuit can be configured to run software of the electronic device, for example, an application playing incoming call alert sound, an application playing short message alert sound, an application playing alarm clock alert sound, an application playing media files, a voice over Internet protocol (VOIP) phone call application, an operating system function, etc. These applications can be used to perform some control operations such as playing incoming call alert sound, playing short message alert sound, playing alarm clock alert sound, playing media files, making a voice phone call, and other functions of the electronic device, which is not limited herein.

The input-output circuit can be configured to achieve data input and data output of the electronic device, that is, to allow the electronic device to receive data from an external device and also allow the electronic device to output data to an external device.

The input-output circuit can further include a sensor. The sensor can include an ambient light sensor, an optical or capacitive infrared proximity sensor, an ultrasonic sensor, a touch sensor (e.g., based on an optical touch sensor and/or a capacitive touch sensor, where the touch sensor may be a part of a touch display screen or may be used independently as a touch sensor structure), an acceleration sensor, a gravity sensor, and other sensors. The input-output circuit can further include an audio assembly. The audio assembly is configured to provide the electronic device with audio input and output functions. The audio assembly may include tone generators and other assemblies for generating and detecting sound.

The input-output circuit can further include one or more display screens. The display screens may include one or more of a liquid crystal display screen, an organic light emitting diode (OLED) display screen, an electronic ink display screen, a plasma display screen, display screens based on other display technologies. As an example, the display screen includes an array of touch sensors (i.e., the display screen can be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, and implementations are not limited thereto.

The input-output circuit can further include a communication circuit. The communication circuit is configured to provide the electronic device with the ability to communicate with external devices. For instance, the communication circuit includes analog/digital input-output interface circuits and wireless communication circuits based on radio frequency signals and/or optical signals. The wireless communication circuit of the communication circuit may include a radio frequency transceiver circuit, a power amplifier circuit, a low-noise amplifier, a switch, a filter, and an antenna. As an example, the wireless communication circuit of the communication circuit includes a circuit for supporting near field communication (NFC) by transmitting and receiving near field coupled electromagnetic signals. The communication circuit may include an NFC antenna and an NFC transceiver. The communication circuit may further include transceivers and antennas for cellular telephone, transceiver circuits and antennas for wireless local area network, and the like.

The input-output circuit can further include other input-output units. The other input-output units may include buttons, joysticks, click wheels, scroll wheels, touch pads, keypads, keyboards, cameras, LEDs, and other status indicators.

The electronic device may further include a battery (not illustrated in FIG. 1A) for powering the electronic device.

Hereinafter, the implementations of the disclosure will be interpreted with reference to the accompanying drawings.

Figure 1B:
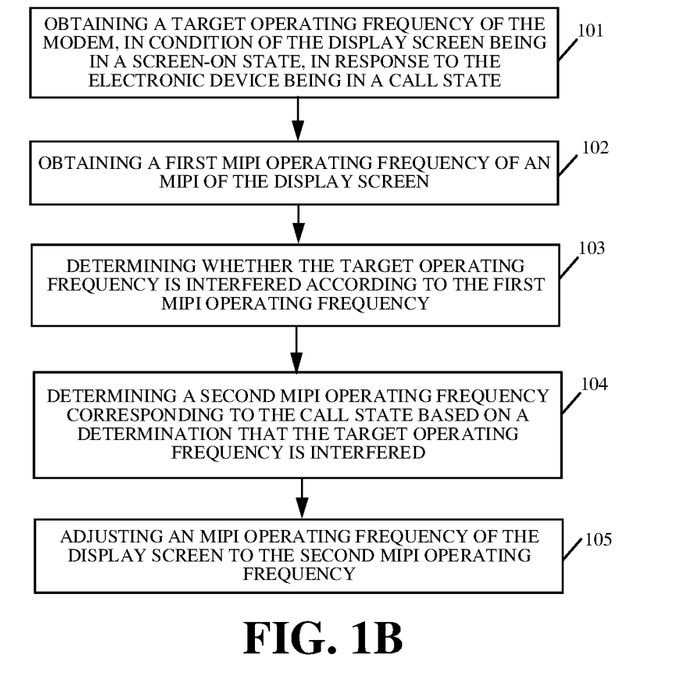
FIG. 1B is a schematic flow chart illustrating a method for electromagnetic interference control according to implementations.

FIG. 1B is a schematic flow chart illustrating a method for electromagnetic interference control according to implementations. The method is for the electronic device of FIG. 1A. The electronic device includes a display screen and a modem. The method begins at 101.

At 101, a target operating frequency of the modem is obtained, in condition of the display screen being in a screen-on state, in response to the electronic device being in a call state.

In the implementation, when the electronic device receives an incoming call or sends a call request under control of the user, it can be determined that the electronic device is in the call state. When the electronic device is in different user scenes, the modem will work at different operating frequencies. When the display screen is in the screen-on state, the interference of the display screen to the target operating frequency of the modem under different user scenes is different. Therefore, the target operating frequency of the modem is obtained when the electronic device is in the call state and the display screen is in the screen-on state.

In at least one implementation, for the above operation 101, the target operating frequency of the modem is obtained as follows.

The target operating frequency reported by the modem is received.

In at least one implementation, the following is further conducted. Reporting the target operating frequency through the modem is stopped in response to the display screen turning to a screen-off state.

In the implementation, the target operating frequency can be detected by the modem and can be reported by the modem to an application processor (AP) in the electronic device. When the display screen turns to the screen-off state, the modem is controlled to stop reporting the target operating frequency to the AP, so that unnecessary power consumption in the screen-off state can be reduced.

At 102, a first MIPI operating frequency of an MIPI of the display screen is obtained.

In the implementation, the AP may obtain the first MIPI operating frequency of the MIPI of the display screen in a preset detection period.

At 103, whether the target operating frequency is interfered is determined according to the first MIPI operating frequency.

In the implementation, after the AP receives the target operating frequency of the modem and obtains the first MIPI operating frequency, the AP can determine whether the target operating frequency is interfered by the first MIPI operating frequency according to the target operating frequency and the first MIPI operating frequency.

In at least one implementation, for the above operation 103, whether the target operating frequency is interfered is determined according to the first MIPI operating frequency as follows.

At 31, a target interference frequency list corresponding to the first MIPI operating frequency is determined according to a correspondence between MIPI operating frequencies and interference frequency lists, where the target interference frequency list contains multiple first interference frequencies corresponding to the first MIPI operating frequency.

At 32, the target operating frequency is sequentially compared with the multiple first interference frequencies in the target interference frequency list, and determine that the target operating frequency is interfered when the target operating frequency is matched with any one of the multiple first interference frequencies.

The electronic device can obtain in advance multiple interference frequency lists of the MIPI of the display screen under multiple MIPI operating frequencies, where each MIPI operating frequency corresponds to one interference frequency list and each interference frequency list contains multiple interference frequencies, and then the correspondence between MIPI operating frequencies and interference frequency lists is set. As such, after the first MIPI operating frequency is obtained, a first interference frequency list (i.e., the target interference frequency list) corresponding to the first MIPI operating frequency is determined, where the first interference frequency list contains multiple first interference frequencies corresponding to the first MIPI operating frequency. That is, the first MIPI operating frequency will cause interference to any one of the multiple first interference frequencies. Each of the multiple first interference frequencies refers to an operating frequency of the modem that will be interfered during communication.

The target operating frequency of the modem can be sequentially compared with the multiple first interference frequencies in the target interference frequency list. If there is a first interference frequency equal to the target operating frequency among the multiple first interference frequencies, the comparison succeeds, that is, the target operating frequency of the modem falls within the range of the target interference frequency list. As such, the target operating frequency is interfered by the first MIPI operating frequency.

At 104, a second MIPI operating frequency corresponding to the call state is determined based on a determination that the target operating frequency is interfered, where interference of the second MIPI operating frequency to the target operating frequency is less than interference of the first MIPI operating frequency to the target operating frequency.

In the implementation, if it is determined that the target operating frequency of the modem is interfered, to ensure stability of the call function, the second MIPI operating frequency that causes less interference to the target operating frequency of the modem can be determined.

In at least one implementation, for the above operation 104, the second MIPI operating frequency corresponding to the call state is determined as follows.

At 41, a target MIPI operating frequency range list corresponding to the call state is obtained, where the target MIPI operating frequency range list contains multiple MIPI operating frequencies.

At 42, an interference intensity value of each of the multiple MIPI operating frequencies to the target operating frequency is determined, to obtain multiple interference intensity values.

At 43, determine, among the multiple interference intensity values, an MIPI operating frequency corresponding to an interference intensity value that is less than a threshold as the second MIPI operating frequency.

In the implementation, the target MIPI operating frequency range list corresponding to the call state is preset. The MIPI of the display screen can operate at the multiple MIPI operating frequencies within the target MIPI operating frequency range list, so that the modem can operate stably in the current call state, thereby ensuring the call quality. After the target MIPI operating frequency range list corresponding to the call state is determined, since the target MIPI operating frequency range list contains the multiple MIPI operating frequencies, an MIPI operating frequency corresponding to an interference intensity value that is less than the threshold to the target operating frequency of the modem is determined as the second MIPI operating frequency. Therefore, the interference of the MIPI operating frequency of the display screen to the target operating frequency of the modem can be reduced and better communication performance can be obtained.

In at least one implementation, for the above operation 104, the second MIPI operating frequency corresponding to the call state is determined as follows.

At 44, a target MIPI operating frequency range list corresponding to the call state is obtained, where the target MIPI operating frequency range list contains multiple MIPI operating frequencies.

At 45, a reference interference frequency list corresponding to each of the multiple MIPI operating frequencies is determined according to a correspondence between MIPI operating frequencies and interference frequency lists, to obtain multiple reference interference frequency lists.

At 46, the target operating frequency is compared with multiple interference frequencies in each of the multiple reference interference frequency lists, to obtain a comparison result, and a second interference frequency list is obtained according to the comparison result.

At 47, an MIPI operating frequency corresponding to the second interference frequency list is determined as the second MIPI operating frequency according to the correspondence between MIPI operating frequencies and interference frequency lists when all interference frequencies in the second interference frequency list fail to match with the target operating frequency.

After the target MIPI operating frequency range list corresponding to the call state is obtained, the reference interference frequency list corresponding to each of the multiple MIPI operating frequencies of the target MIPI operating frequency range list is determined according to the correspondence between MIPI operating frequencies and interference frequency lists, to obtain the multiple reference interference frequency lists. For each MIPI operating frequency and its corresponding reference interference frequency list, the target operating frequency is sequentially compared with multiple interference frequencies in the reference interference frequency list; if the target operating frequency is equal to any one of the multiple interference frequencies in the reference interference frequency list, the comparison succeeds. That is, the target operating frequency falls within the range of the reference interference frequency list. Thereafter, determine, from the multiple reference interference frequency lists, a reference interference frequency list that the target operating frequency fails to fall within as the second interference frequency list. That is, the target operating frequency fails to match with all interference frequencies in the second interference frequency list. Therefore, an MIPI operating frequency corresponding to the second interference frequency list (i.e., the second MIPI operating frequency) is an MIPI operating frequency that causes less interference to the target operating frequency of the modem.

At 105, an MIPI operating frequency of the display screen is adjusted to the second MIPI operating frequency.

In the implementation, after the second MIPI operating frequency is determined, the MIPI operating frequency of the MIPI of the display screen can be adjusted from the first MIPI operating frequency to the second MIPI operating frequency. As such, electromagnetic interference of the MIPI of the display screen to the modem during communication can be eliminated or reduced and the best communication performance and call quality can be obtained.

Furthermore, during adjusting the MIPI operating frequency of the display screen, a screen parameter(s) of the display screen can be adjusted, to ensure stable working of the display screen.

In at least one implementation, during adjusting the MIPI operating frequency of the display screen to the second MIPI operating frequency, the following is further conducted.

At A1, a reference screen parameter value of the display screen is determined according to a frame rate calculation equation and the second MIPI operating frequency when an amount of change in a frame rate of the display screen after MIPI frequency switching is less than a first threshold.

At A2, a screen parameter of the display screen is dynamically adjusted according to the reference screen parameter value to a target screen parameter value, where the screen parameter includes at least one of the following porch values in the frame rate calculation equation: horizontal back porch (HBP), horizontal front porch (HFP), vertical back porch (VBP), vertical front porch (VFP), vertical sync active (VSA), or horizontal sync active (HSA).

In at least one implementation, the frame rate calculation formula is as follows.

$$FPS = CLK\_rate * 2 * lane\_num / ((height + VBP + VSA + VFP) * (weight + HBP + HFP + HSA) * bits\_perpixel).$$

The FPS represents the frame rate of the display screen; CLK_rate represents the MIPI frequency; lane_num represents the number of channels; height and weight represent the physical size of the display screen; VBP represents the number of invalid lines after a vertical sync signal at the beginning of one frame of image; VFP represents the number of invalid lines before the vertical sync signal after the end of one frame of image; VSA represents the width of the vertical sync signal; HBP represents the number of clocks from the start of a horizontal sync signal to the start of one line of valid data; HFP represents the number of clocks from the end of one line of valid data to the start of the next horizontal sync signal; HSA represents the width of the horizontal sync signal; bits_perpixel represents the width of displayed RGB data.

The first threshold may be a value obtained through experience, which can ensure stability of contents displayed on the display screen before and after frequency switching. For example, the first threshold may be the maximum allowable error range of the chip of the display screen, i.e., 1%.

According to the implementation, after frequency-hopping of the electronic device, a parameter(s) of the display screen of the electronic device will be changed. The frame rate is a parameter for indicating stability of display of the display screen after frequency-hopping. Therefore, based on the frame rate calculation formula, the electronic device can predetermine the reference screen parameter value of the screen parameter that need to be synchronously adjusted during frequency-hopping. The electronic device can first adjust the screen parameter to the reference screen parameter value, and further dynamically adjust the screen parameter on basis of the reference screen parameter value, to finally reach the target screen parameter value, thereby improving the stability of display of the display screen.

In at least one implementation, for the above operation A2, the screen parameter includes a horizontal screen parameter, where the horizontal screen parameter includes at least one of the HBP, the HFP, or the HSA, and the screen parameter of the display screen is dynamically adjusted according to the reference screen parameter value to the target screen parameter value as follows.

The horizontal screen parameter of the display screen is dynamically adjusted according to the reference screen parameter value, in such a manner that an amount of change in a line scan duration of the display screen after the MIPI frequency switching is less than a second threshold.

If the screen parameter is a horizontal screen parameter, the electronic device can adjust the horizontal screen parameter to the reference screen parameter value and further dynamically adjust the screen parameter on basis of the reference screen parameter value, such that the amount of change in the line scan duration of the display screen after the MIPI frequency switching is less than the second threshold. As such, the stability of display of the display screen can be improved.

For example, when the primary frequency of the MIPI of the display screen is 514.5 MHz, the measured line scan duration is 7.18 us. When the MIPI frequency is switched to the auxiliary frequency of 529 MHz, fine-tuning is performed according to the reference screen parameter value of the screen parameter, the line scan duration is also measured, and the value of the fine-tuned screen parameter when the line scan duration is 7.18 us is determined as the target screen parameter value. This is mainly because the frame rate calculation formula is only a theoretical calculation formula. In fact, due to physical differences between devices, accuracy of this reference screen parameter value is not very high. On the other hand, actually, the MIPI frequency is different from the values of the screen parameters (difference by MHz and tens or hundreds), and the horizontal screen parameter of the display screen has a greater impact on the stability of display. Therefore, the value of the horizontal screen parameter is calibrated based on the actual detection result to improve the stability.

Furthermore, if the screen parameter includes a vertical screen parameter, where the vertical screen parameter includes at least one of the VBP, the VFP, or the VAS, the target screen parameter value is equal to the reference screen parameter value, that is, adjusting the porch value in the vertical direction has no influence on the line scan duration.

According to the implementation, when the screen parameter includes the horizontal screen parameter, the electronic device can calibrate the reference screen parameter value according to the constraint condition of line scan time and the actual detection result, thereby improving the stability of the display screen after frequency-hopping.

According to the method, the target operating frequency of the modem is obtained, in condition of the display screen being in the screen-on state, in response to the electronic device being in the call state. The first MIPI operating frequency of the MIPI of the display screen is obtained. Whether the target operating frequency is interfered is determined according to the first MIPI operating frequency. The second MIPI operating frequency corresponding to the call state is determined if the target operating frequency is interfered. The MIPI operating frequency of the display screen is adjusted to the second MIPI operating frequency. In this case, without changing design of the hardware of the electronic device, the MIPI operating frequency of the display screen can be dynamically adjusted when the electronic device is in different user scenes, so that the MIPI of the display screen can operate at an operating frequency that causes less interference to the modem. As such, electromagnetic interference of the display screen to the modem during communication can be eliminated or reduced and the best communication performance and call quality can be obtained.

Figure 2:
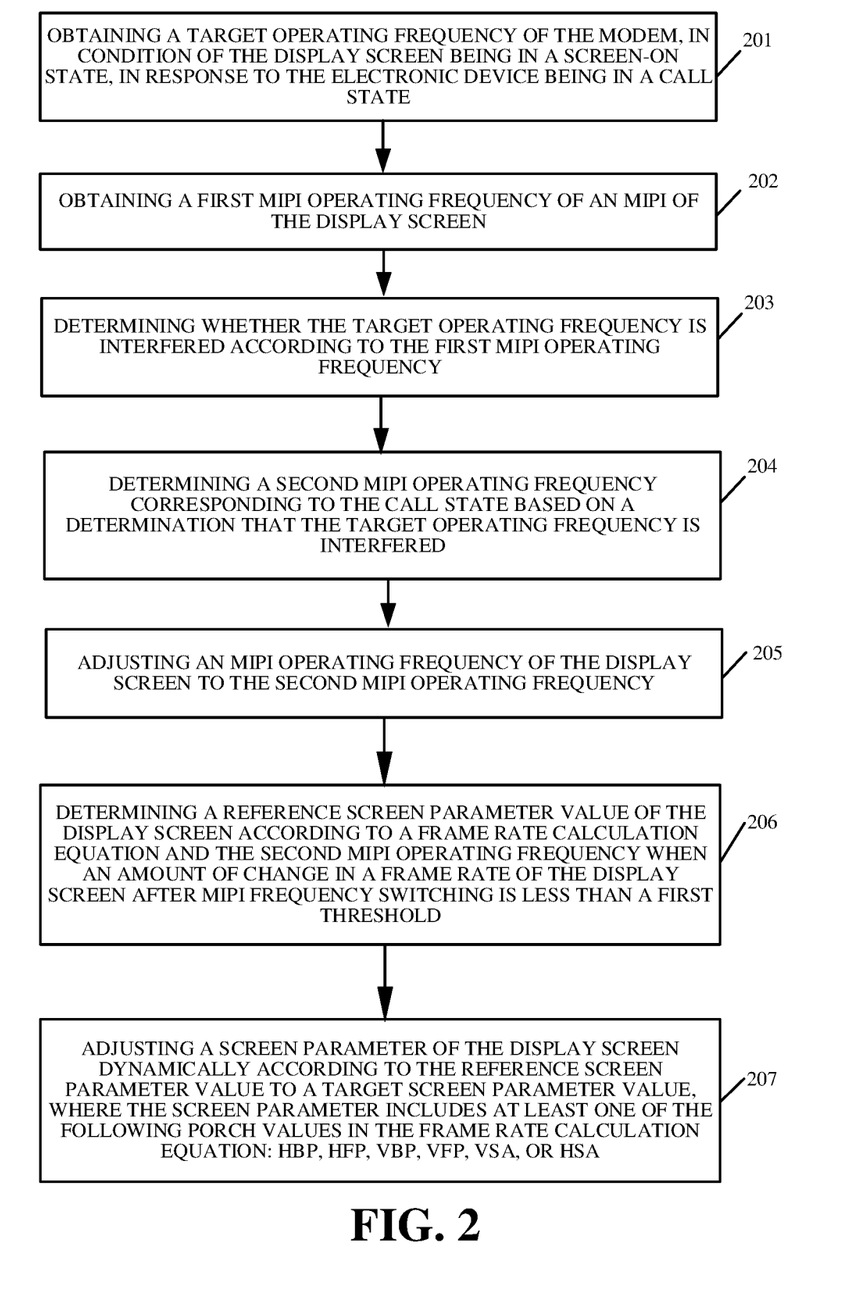
FIG. 2 is a schematic flow chart illustrating a method for electromagnetic interference control according to other implementations.

FIG. 2 is a schematic flow chart illustrating a method for electromagnetic interference control according to other implementations. The method is for the electronic device of FIG. 1A. The electronic device includes a display screen and a modem. The method begins at 201.

At 201, a target operating frequency of the modem is obtained, in condition of the display screen being in a screen-on state, in response to the electronic device being in a call state.

At 202, a first MIPI operating frequency of an MIPI of the display screen is obtained.

At 203, whether the target operating frequency is interfered is determined according to the first MIPI operating frequency.

At 204, a second MIPI operating frequency corresponding to the call state is determined based on a determination that the target operating frequency is interfered, where interference of the second MIPI operating frequency to the target operating frequency is less than interference of the first MIPI operating frequency to the target operating frequency.

At 205, an MIPI operating frequency of the display screen is adjusted to the second MIPI operating frequency.

At 206, a reference screen parameter value of the display screen is determined according to a frame rate calculation equation and the second MIPI operating frequency when an amount of change in a frame rate of the display screen after MIPI frequency switching is less than a first threshold.

At 207, a screen parameter of the display screen is dynamically adjusted according to the reference screen parameter value to a target screen parameter value, where the screen parameter includes at least one of the following porch values in the frame rate calculation equation: HBP, HFP, VBP, VFP, VSA, or HSA.

For the details of the above operations 201-207, reference can be made to the description of the method of FIG. 1B, which is not limited herein.

According to the method, the target operating frequency of the modem is obtained, in condition of the display screen being in the screen-on state, in response to the electronic device being in the call state. The first MIPI operating frequency of the MIPI of the display screen is obtained. Whether the target operating frequency is interfered is determined according to the first MIPI operating frequency. The second MIPI operating frequency corresponding to the call state is determined based on a determination that the target operating frequency is interfered. The MIPI operating frequency of the display screen is adjusted to the second MIPI operating frequency. The reference screen parameter value of the display screen is determined when the amount of change in the frame rate of the display screen after MIPI frequency switching is less than the first threshold. According to the reference screen parameter value, the screen parameter of the display screen is dynamically adjusted to the target screen parameter value. In this case, without changing design of the hardware of the electronic device, the MIPI operating frequency of the display screen can be dynamically adjusted when the electronic device is in different user scenes. As such, electromagnetic interference of the display screen to the modem during communication can be eliminated or reduced, better communication performance and call quality can be obtained, and stability of display of the display screen can be improved.

Figure 3:
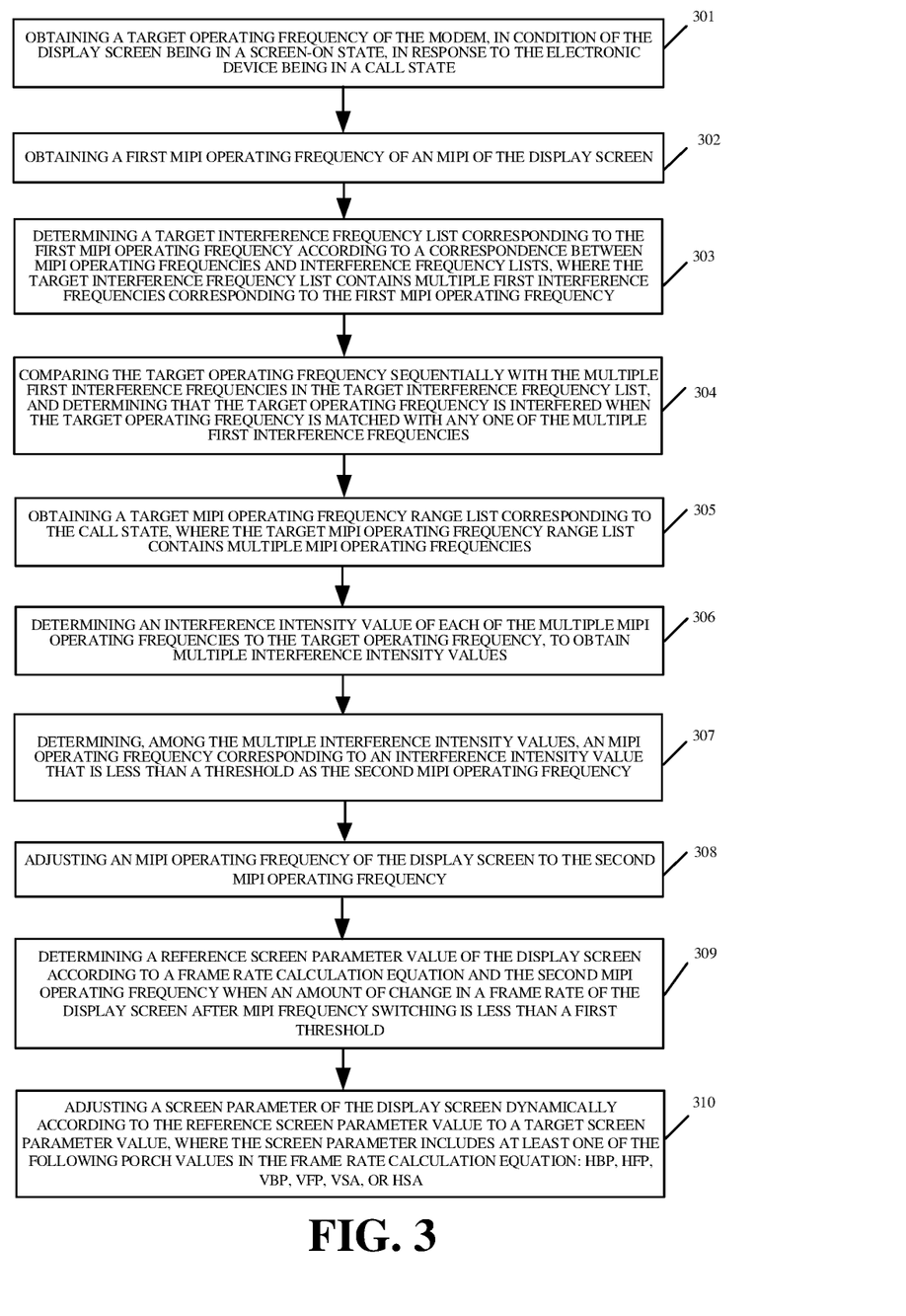
FIG. 3 is a schematic flow chart illustrating a method for electromagnetic interference control according to other implementations.

FIG. 3 is a schematic flow chart illustrating a method for electromagnetic interference control according to other implementations. The method is for the electronic device of FIG. 1A. The electronic device includes a display screen and a modem. The method begins at 301.

At 301, a target operating frequency of the modem is obtained, in condition of the display screen being in a screen-on state, in response to the electronic device being in a call state.

At 302, a first MIPI operating frequency of an MIPI of the display screen is obtained.

At 303, a target interference frequency list corresponding to the first MIPI operating frequency is determined according to a correspondence between MIPI operating frequencies and interference frequency lists, where the target interference frequency list contains multiple first interference frequencies corresponding to the first MIPI operating frequency.

At 304, the target operating frequency is sequentially compared with the multiple first interference frequencies in the target interference frequency list, and determine that the target operating frequency is interfered when the target operating frequency is matched with any one of the multiple first interference frequencies.

At 305, a target MIPI operating frequency range list corresponding to the call state is obtained, where the target MIPI operating frequency range list contains multiple MIPI operating frequencies.

At 306, an interference intensity value of each of the multiple MIPI operating frequencies to the target operating frequency is determined, to obtain multiple interference intensity values.

At 307, determine, among the multiple interference intensity values, an MIPI operating frequency corresponding to an interference intensity value that is less than a threshold as the second MIPI operating frequency.

At 308, an MIPI operating frequency of the display screen is adjusted to the second MIPI operating frequency.

At 309, a reference screen parameter value of the display screen is determined according to a frame rate calculation equation and the second MIPI operating frequency when an amount of change in a frame rate of the display screen after MIPI frequency switching is less than a first threshold.

At 310, a screen parameter of the display screen is dynamically adjusted according to the reference screen parameter value to a target screen parameter value, where the screen parameter includes at least one of the following porch values in the frame rate calculation equation: HBP, HFP, VBP, VFP, VSA, or HSA.

For the details of the above operations 301-310, reference can be made to the description of the method of FIG. 1B, which is not limited herein.

According to the method, when the electronic device is in the call state, if the display screen is in the screen-on state, the target operating frequency of the modem and the first MIPI operating frequency of the MIPI of the display screen are obtained. If the target operating frequency is interfered by the first MIPI operating frequency, the target MIPI operating frequency range list corresponding to the call state is obtained. The interference intensity value of each of the multiple MIPI operating frequencies to the target operating frequency is determined, to obtain the multiple interference intensity values. Determine, among the multiple interference intensity values, an MIPI operating frequency corresponding to an interference intensity value that is less than the threshold as the second MIPI operating frequency. The MIPI operating frequency of the display screen is adjusted to the second MIPI operating frequency. When the amount of change in the frame rate of the display screen after MIPI frequency switching is less than the first threshold, the screen parameter of the display screen is dynamically adjusted according to the reference screen parameter value to the target screen parameter value. In this case, the MIPI operating frequency of the display screen can be dynamically adjusted when the electronic device is in different user scenes. As such, electromagnetic interference of the display screen to the modem during communication can be eliminated or reduced, better communication performance and call quality can be obtained, and stability of display of the display screen can be improved.

Figure 4:
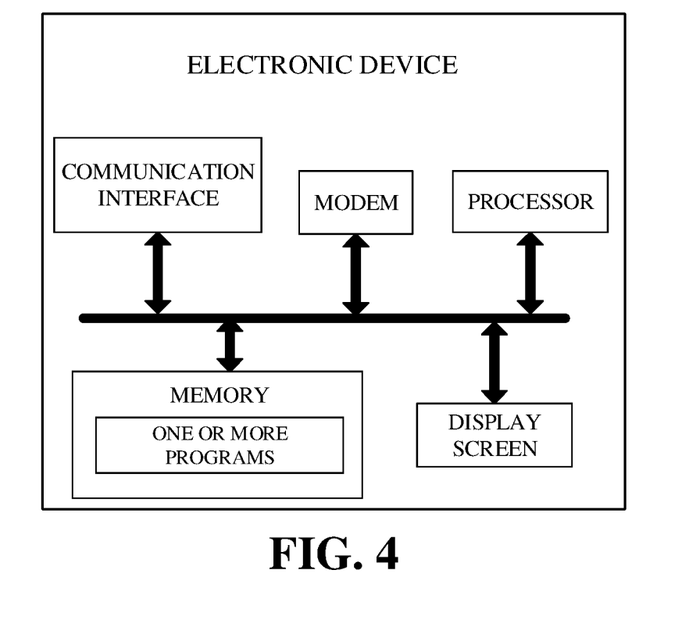
FIG. 4 is a schematic structural diagram illustrating an electronic device according to other implementations.

FIG. 4 is a schematic structural diagram illustrating an electronic device according to other implementations. As illustrated in FIG. 4, the electronic device includes a processor, a memory, a display screen, a modem, and a communication interface. The memory is configured to store a computer program such as one or more programs. The one or more programs are configured to be executed by the processor and include instructions configured to perform the following operations.

A target operating frequency of the modem is obtained, in condition of the display screen being in a screen-on state, in response to the electronic device being in a call state. A first MIPI operating frequency of an MIPI of the display screen is obtained. A second MIPI operating frequency corresponding to the call state is determined in response to determining the target operating frequency being interfered based on the first MIPI operating frequency, where interference of the second MIPI operating frequency to the target operating frequency is less than interference of the first MIPI operating frequency to the target operating frequency. An MIPI operating frequency of the display screen is adjusted to the second MIPI operating frequency.

In at least one implementation, in terms of obtaining the target operating frequency of the modem, the instructions of the one or more programs are configured to perform the following operations.

The target operating frequency reported by the modem is received.

The one or more programs further include instructions configured to perform the following operations.

Reporting the target operating frequency through the modem is stopped in response to the display screen turning to a screen-off state.

In at least one implementation, the instructions of the one or more programs are further configured to perform the following operations.

A target interference frequency list corresponding to the first MIPI operating frequency is determined according to a correspondence between MIPI operating frequencies and interference frequency lists, where the target interference frequency list contains multiple first interference frequencies corresponding to the first MIPI operating frequency.

The target operating frequency is sequentially compared with the multiple first interference frequencies in the target interference frequency list, and determine that the target operating frequency is interfered when the target operating frequency is matched with any one of the multiple first interference frequencies.

In at least one implementation, in terms of determining the second MIPI operating frequency corresponding to the call state, the instructions of the one or more programs are configured to perform the following operations.

A target MIPI operating frequency range list corresponding to the call state is obtained, where the target MIPI operating frequency range list contains multiple MIPI operating frequencies.

An interference intensity value of each of the multiple MIPI operating frequencies to the target operating frequency is determined, to obtain multiple interference intensity values.

Determine, among the multiple interference intensity values, an MIPI operating frequency corresponding to an interference intensity value that is less than a threshold as the second MIPI operating frequency.

In at least one implementation, in terms of determining the second MIPI operating frequency corresponding to the call state, the instructions of the one or more programs are configured to perform the following operations.

A target MIPI operating frequency range list corresponding to the call state is obtained, where the target MIPI operating frequency range list contains multiple MIPI operating frequencies.

A reference interference frequency list corresponding to each of the multiple MIPI operating frequencies is determined according to a correspondence between MIPI operating frequencies and interference frequency lists, to obtain multiple reference interference frequency lists.

The target operating frequency is compared with multiple interference frequencies in each of the multiple reference interference frequency lists, to obtain a comparison result, and a second interference frequency list is obtained according to the comparison result.

An MIPI operating frequency corresponding to the second interference frequency list is determined as the second MIPI operating frequency according to the correspondence between MIPI operating frequencies and interference frequency lists when all interference frequencies in the second interference frequency list fail to match with the target operating frequency.

In at least one implementation, the one or more programs further include instructions configured to perform the following operations.

During adjusting the MIPI operating frequency of the display screen to the second MIPI operating frequency, a reference screen parameter value of the display screen is determined according to a frame rate calculation equation and the second MIPI operating frequency when an amount of change in a frame rate of the display screen after MIPI frequency switching is less than a first threshold.

A screen parameter of the display screen is dynamically adjusted according to the reference screen parameter value to a target screen parameter value, where the screen parameter includes at least one of the following porch values in the frame rate calculation equation: HBP, HFP, VBP, VFP, VSA, or HSA.

In at least one implementation, the screen parameter includes a horizontal screen parameter, where the horizontal screen parameter includes at least one of the HBP, the HFP, or the HSA.

In terms of adjusting the screen parameter of the display screen dynamically according to the reference screen parameter value to the target screen parameter value, the instructions of the one or more programs are configured to perform the following operations.

The horizontal screen parameter of the display screen is dynamically adjusted according to the reference screen parameter value, in such a manner that an amount of change in a line scan duration of the display screen after the MIPI frequency switching is less than a second threshold.

The foregoing solution of the implementations of the disclosure is mainly described from the viewpoint of execution process of the method. It can be understood that, in order to implement the above functions, the electronic device includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the electronic device in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 5:
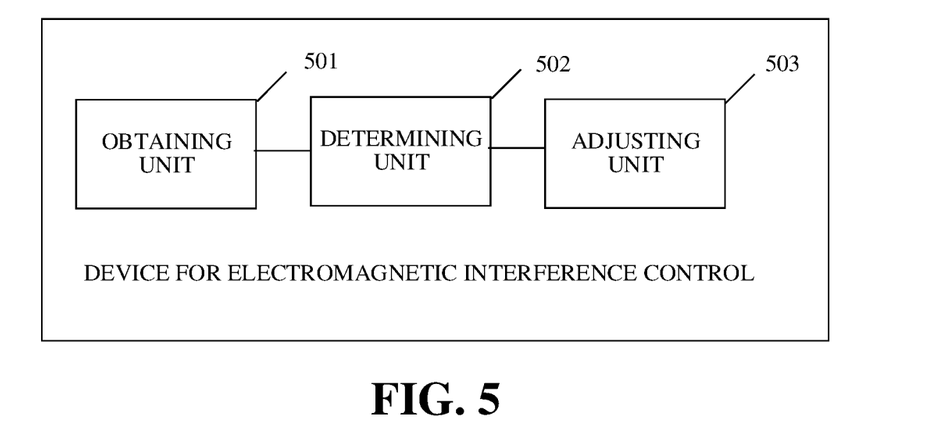
FIG. 5 is schematic structural diagram illustrating a device for electromagnetic interference control according to other implementations.

FIG. 5 is schematic structural diagram illustrating a device for electromagnetic interference control according to other implementations. The device is applicable to the electronic device of FIG. 1A. The electronic device includes a display screen and a modem. The device includes an obtaining unit 501, a determining unit 502, and an adjusting unit 503.

The obtaining unit 501 is configured to obtain a target operating frequency of the modem in the case that the display screen is in a screen-on state, when the electronic device is in a call state, and obtain a first MIPI operating frequency of an MIPI of the display screen.

The determining unit 502 is configured to determine, according to the first MIPI operating frequency, whether the target operating frequency is interfered, and determine a second MIPI operating frequency corresponding to the call state based on a determination that the target operating frequency is interfered, where interference of the second MIPI operating frequency to the target operating frequency is less than interference of the first MIPI operating frequency to the target operating frequency.

The adjusting unit 503 is configured to adjust an MIPI operating frequency of the display screen to the second MIPI operating frequency.

In at least one implementation, the obtaining unit 501 configured to obtain the target operating frequency of the modem is configured to receive the target operating frequency reported by the modem.

The obtaining unit 501 is further configured to stop reporting by the modem the target operating frequency when the display screen turns to a screen-off state.

In at least one implementation, the determining unit 502 configured to determine, according to the first MIPI operating frequency, whether the target operating frequency is interfered is configured to: determine a target interference frequency list corresponding to the first MIPI operating frequency according to a correspondence between MIPI operating frequencies and interference frequency lists, where the target interference frequency list contains multiple first interference frequencies corresponding to the first MIPI operating frequency; and compare the target operating frequency sequentially with the multiple first interference frequencies in the target interference frequency list, and determine that the target operating frequency is interfered when the target operating frequency is matched with any one of the multiple first interference frequencies.

In at least one implementation, the determining unit 502 configured to determine the second MIPI operating frequency corresponding to the call state is configured to: obtain a target MIPI operating frequency range list corresponding to the call state, where the target MIPI operating frequency range list contains multiple MIPI operating frequencies; determine an interference intensity value of each of the multiple MIPI operating frequencies to the target operating frequency, to obtain multiple interference intensity values; and determine, among the multiple interference intensity values, an MIPI operating frequency corresponding to an interference intensity value that is less than a threshold as the second MIPI operating frequency.

In at least one implementation, the determining unit 502 configured to determine the second MIPI operating frequency corresponding to the call state is configured to: obtain a target MIPI operating frequency range list corresponding to the call state, where the target MIPI operating frequency range list contains multiple MIPI operating frequencies; determine a reference interference frequency list corresponding to each of the multiple MIPI operating frequencies according to a correspondence between MIPI operating frequencies and interference frequency lists, to obtain multiple reference interference frequency lists; compare the target operating frequency with multiple interference frequencies in each of the multiple reference interference frequency lists, to obtain a comparison result, and obtain a second interference frequency list according to the comparison result; and determine an MIPI operating frequency corresponding to the second interference frequency list as the second MIPI operating frequency according to the correspondence between MIPI operating frequencies and interference frequency lists when all interference frequencies in the second interference frequency list fail to match with the target operating frequency.

In at least one implementation, the determining unit 502 is further configured to determine a reference screen parameter value of the display screen according to a frame rate calculation equation and the second MIPI operating frequency when an amount of change in a frame rate of the display screen after MIPI frequency switching is less than a first threshold, during adjusting the MIPI operating frequency of the display screen to the second MIPI operating frequency. The adjusting unit 503 is further configured to adjust a screen parameter of the display screen dynamically according to the reference screen parameter value to a target screen parameter value, where the screen parameter includes at least one of the following porch values in the frame rate calculation equation: HBP, HFP, VBP, VFP, VSA, or HSA.

In at least one implementation, the screen parameter includes a horizontal screen parameter, where the horizontal screen parameter includes at least one of the HBP, the HFP, or the HSA.

The adjusting unit 503 configured to adjust the screen parameter of the display screen dynamically according to the reference screen parameter value to the target screen parameter value is configured to: adjust the horizontal screen parameter of the display screen dynamically according to the reference screen parameter value, in such a manner that an amount of change in a line scan duration of the display screen after the MIPI frequency switching is less than a second threshold.

According to the device, the target operating frequency of the modem is obtained in the case that the display screen is in the screen-on state, when the electronic device is in the call state. The first MIPI operating frequency of the MIPI of the display screen is obtained. Whether the target operating frequency is interfered is determined according to the first MIPI operating frequency. The second MIPI operating frequency corresponding to the call state is determined based on a determination that the target operating frequency is interfered. The MIPI operating frequency of the display screen is adjusted to the second MIPI operating frequency. In this case, without changing design of the hardware of the electronic device, the MIPI operating frequency of the display screen can be dynamically adjusted when the electronic device is in different user scenes, so that the MIPI of the display screen can operate at an operating frequency that causes less interference to the modem. As such, electromagnetic interference of the display screen to the modem during communication can be eliminated or reduced and the best communication performance and call quality can be obtained.

It is to be noted that, the electronic device described in the implementations of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

The obtaining unit 501, the determining unit 502, and the adjusting unit 503 may be control circuits or processors.

Implementations further provide a non-transitory computer readable storage medium. The non-transitory computer readable storage medium is configured to store a computer program for electronic data interchange. The computer program causes a computer to execute all or part of operations of the method for electromagnetic interference control of the above.

Implementations further provide a computer program product. The computer program product includes a non-transitory computer-readable storage medium storing a computer program. The computer program is operable to cause the computer execute all or part of operations of the method for electromagnetic interference control of the above.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software program module.

The integrated unit may be stored in a computer readable storage when it is implemented in the form of a software program module and is sold or used as a separate product.

Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable storage, which may include a flash memory, a ROM, a RAM, disk or CD, and so on.

The implementations of this application are described in detail above. Some examples are used herein to illustrate the principle and implementation manners of this application. The description of the above implementations is only used to help understand the method and core idea of this application. Meanwhile, for those of ordinary skill in the art, according to the idea of this application, there will be changes in the implementation manner and the application scope. In summary, contents of this specification should not be construed as a limitation on this application.

What is claimed is:

1. A method for electromagnetic interference control, for an electronic device comprising a display screen and a modem, the method comprising:
    obtaining a target operating frequency of the modem, in condition of the display screen being in a screen-on state, in response to the electronic device being in a call state;
    obtaining a first mobile industry processor interface (MIPI) operating frequency of an MIPI of the display screen;
    determining a second MIPI operating frequency corresponding to the call state in response to determining the target operating frequency being interfered based on the first MIPI operating frequency, wherein interference of the second MIPI operating frequency to the target operating frequency is less than interference of the first MIPI operating frequency to the target operating frequency;
    adjusting an MIPI operating frequency of the display screen to the second MIPI operating frequency; and
    during adjusting the MIPI operating frequency of the display screen to the second MIPI operating frequency, determining a reference screen parameter value of the display screen according to a frame rate calculation equation and the second MIPI operating frequency when an amount of change in a frame rate of the display screen after MIPI frequency switching is less than a first threshold; and
    adjusting a screen parameter of the display screen dynamically according to the reference screen parameter value to a target screen parameter value, wherein the screen parameter comprises at least one of the following porch values in the frame rate calculation equation: horizontal back porch (HBP), horizontal front porch (HFP), vertical back porch (VBP), vertical front porch (VFP), vertical sync active (VSA), or horizontal sync active (HSA).

2. The method of claim 1, wherein
    obtaining the target operating frequency of the modem comprises:
        receiving the target operating frequency reported by the modem; and the method further comprises:
        stopping reporting the target operating frequency through the modem in response to the display screen turning to a screen-off state.

3. The method of claim 1, further comprising:
    determining a target interference frequency list corresponding to the first MIPI operating frequency according to a correspondence between MIPI operating frequencies and interference frequency lists, wherein the target interference frequency list contains a plurality of first interference frequencies corresponding to the first MIPI operating frequency; and
    comparing the target operating frequency sequentially with the plurality of first interference frequencies in the target interference frequency list, and determining that the target operating frequency is interfered when the target operating frequency is matched with any one of the plurality of first interference frequencies.

4. The method of claim 1, wherein determining the second MIPI operating frequency corresponding to the call state comprises:
    obtaining a target MIPI operating frequency range list corresponding to the call state, wherein the target MIPI operating frequency range list contains a plurality of MIPI operating frequencies;
    determining an interference intensity value of each of the plurality of MIPI operating frequencies to the target operating frequency, to obtain a plurality of interference intensity values; and
    determining, among the plurality of interference intensity values, an MIPI operating frequency corresponding to an interference intensity value that is less than a threshold as the second MIPI operating frequency.

5. The method of claim 1, wherein determining the second MIPI operating frequency corresponding to the call state comprises:
    obtaining a target MIPI operating frequency range list corresponding to the call state, wherein the target MIPI operating frequency range list contains a plurality of MIPI operating frequencies;
    determining a reference interference frequency list corresponding to each of the plurality of MIPI operating frequencies according to a correspondence between MIPI operating frequencies and interference frequency lists, to obtain a plurality of reference interference frequency lists;
    comparing the target operating frequency with a plurality of interference frequencies in each of the plurality of reference interference frequency lists, to obtain a comparison result, and obtaining a second interference frequency list according to the comparison result; and
    determining an MIPI operating frequency corresponding to the second interference frequency list as the second MIPI operating frequency according to the correspondence between MIPI operating frequencies and interference frequency lists when all interference frequencies in the second interference frequency list fail to match with the target operating frequency.

6. The method of claim 1, wherein
    the screen parameter comprises a horizontal screen parameter, wherein the horizontal screen parameter comprises at least one of the HBP, the HFP, or the HSA; and adjusting the screen parameter of the display screen dynamically according to the reference screen parameter value to the target screen parameter value comprises:
  adjusting the horizontal screen parameter of the display screen dynamically according to the reference screen parameter value, in such a manner that an amount of change in a line scan duration of the display screen after the MIPI frequency switching is less than a second threshold.

7. The method of claim 1, wherein the frame rate calculation equation is as follows:

$$FPS=CLK\_rate*2*lane\_num/((height+VBP+VSA+VFP)*(weight+HBP+HFP+HSA)*bits\_perpixel),$$

wherein FPS represents the frame rate of the display screen, CLK_rate represents the MIPI frequency, lane_num represents the number of channels, height and weight represent the physical size of the display screen, VBP represents the number of invalid lines after a vertical sync signal at the beginning of one frame of image, VSA represents the width of the vertical sync signal, VFP represents the number of invalid lines before the vertical sync signal after the end of one frame of image, HBP represents the number of clocks from the start of a horizontal sync signal to the start of one line of valid data, HFP represents the number of clocks from the end of one line of valid data to the start of the next horizontal sync signal, HSA represents the width of the horizontal sync signal, and bits_perpixel represents the width of displayed RGB data.

8. The method of claim 1, wherein
the screen parameter comprises a vertical screen parameter, wherein the vertical screen parameter comprises at least one of the VBP, the VFP, or the VAS; and
the method further comprises:
  assigning the reference screen parameter value as the target screen parameter value.

9. An electronic device comprising:
a display screen;
a modem;
at least one processor; and
a memory, coupled to the at least one processor and storing at least one computer executable instruction thereon which, when executed by the at least one processor, causes the at least one processor to:
  obtain a target operating frequency of the modem, in condition of the display screen being in a screen-on state, in response to the electronic device being in a call state, and obtain a first mobile industry processor interface (MIPI) operating frequency of an MIPI of the display screen;
  determine a second MIPI operating frequency corresponding to the call state in response to determining the target operating frequency being interfered based on the first MIPI operating frequency, wherein interference of the second MIPI operating frequency to the target operating frequency is less than interference of the first MIPI operating frequency to the target operating frequency; and
  adjust an MIPI operating frequency of the display screen to the second MIPI operating frequency;
  determine a reference screen parameter value of the display screen according to a frame rate calculation equation and the second MIPI operating frequency when an amount of change in a frame rate of the display screen after MIPI frequency switching is less than a first threshold, during adjusting the MIPI operating frequency of the display screen to the second MIPI operating frequency; and
  adjust a screen parameter of the display screen dynamically according to the reference screen parameter value to a target screen parameter value, wherein the screen parameter comprises at least one of the following porch values in the frame rate calculation equation: horizontal back porch (HBP), horizontal front porch (HFP), vertical back porch (VBP), vertical front porch (VFP), vertical sync active (VSA), or horizontal sync active (HSA).

10. The electronic device of claim 9, wherein
the at least one processor configured to obtain the target operating frequency of the modem is configured to receive the target operating frequency reported by the modem; and
the at least one processor is further configured to stop reporting the target operating frequency through the modem in response to the display screen turning to a screen-off state.

11. The electronic device of claim 9, wherein the at least one processor is further configured to:
  determine a target interference frequency list corresponding to the first MIPI operating frequency according to a correspondence between MIPI operating frequencies and interference frequency lists, wherein the target interference frequency list contains a plurality of first interference frequencies corresponding to the first MIPI operating frequency; and
  compare the target operating frequency sequentially with the plurality of first interference frequencies in the target interference frequency list, and determine that the target operating frequency is interfered when the target operating frequency is matched with any one of the plurality of first interference frequencies.

12. The electronic device of claim 9, wherein the at least one processor configured to determine the second MIPI operating frequency corresponding to the call state is configured to:
  obtain a target MIPI operating frequency range list corresponding to the call state, wherein the target MIPI operating frequency range list contains a plurality of MIPI operating frequencies;
  determine an interference intensity value of each of the plurality of MIPI operating frequencies to the target operating frequency, to obtain a plurality of interference intensity values; and
  determine, among the plurality of interference intensity values, an MIPI operating frequency corresponding to an interference intensity value that is less than a threshold as the second MIPI operating frequency.

13. The electronic device of claim 9, wherein the at least one processor configured to determine the second MIPI operating frequency corresponding to the call state is configured to:
  obtain a target MIPI operating frequency range list corresponding to the call state, wherein the target MIPI operating frequency range list contains a plurality of MIPI operating frequencies;
  determine a reference interference frequency list corresponding to each of the plurality of MIPI operating frequencies according to a correspondence between MIPI operating frequencies and interference frequency lists, to obtain a plurality of reference interference frequency lists;

compare the target operating frequency with a plurality of interference frequencies in each of the plurality of reference interference frequency lists, to obtain a comparison result, and obtain a second interference frequency list according to the comparison result; and determine an MIPI operating frequency corresponding to the second interference frequency list as the second MIPI operating frequency according to the correspondence between MIPI operating frequencies and interference frequency lists when all interference frequencies in the second interference frequency list fail to match with the target operating frequency.

14. The electronic device of claim 9, wherein the screen parameter comprises a horizontal screen parameter, wherein the horizontal screen parameter comprises at least one of the HBP, the HFP, or the HSA; and the at least one processor configured to adjust the screen parameter of the display screen dynamically according to the reference screen parameter value to the target screen parameter value is configured to:

adjust the horizontal screen parameter of the display screen dynamically according to the reference screen parameter value, in such a manner that an amount of change in a line scan duration of the display screen after the MIPI frequency switching is less than a second threshold.

15. The electronic device of claim 9, wherein the screen parameter comprises a vertical screen parameter, wherein the vertical screen parameter comprises at least one of the VBP, the VFP, or the VAS; and the at least one processor is further configured to:

assign the reference screen parameter value as the target screen parameter value.

16. A non-transitory computer readable storage medium storing a computer program which, when executed by a processor, causes the processor to:

obtain a target operating frequency of a modem of an electronic device, in condition of a display screen of the electronic device being in a screen-on state, in response to the electronic device being in a call state, and obtain a first mobile industry processor interface (MIPI) operating frequency of an MIPI of the display screen;

determine a second MIPI operating frequency corresponding to the call state in response to determining the target operating frequency being interfered based on the first MIPI operating frequency, wherein interference of the second MIPI operating frequency to the target operating frequency is less than interference of the first MIPI operating frequency to the target operating frequency;

adjust an MIPI operating frequency of the display screen to the second MIPI operating frequency;

determine a reference screen parameter value of the display screen according to a frame rate calculation equation and the second MIPI operating frequency when an amount of change in a frame rate of the display screen after MIPI frequency switching is less than a first threshold, during adjusting the MIPI operating frequency of the display screen to the second MIPI operating frequency; and adjust a screen parameter of the display screen dynamically according to the reference screen parameter value to a target screen parameter value, wherein the screen parameter comprises at least one of the following porch values in the frame rate calculation equation: horizontal back porch (HBP), horizontal front porch (HFP), vertical back porch (VBP), vertical front porch (VFP), vertical sync active (VSA), or horizontal sync active (HSA).

17. The non-transitory computer readable storage medium of claim 16, wherein the computer program executed by the processor to obtain the target operating frequency of the modem is executed by the processor to receive the target operating frequency reported by the modem; and the computer program is further executed by the processor to stop reporting the target operating frequency through the modem in response to the display screen turning to a screen-off state.

18. The non-transitory computer readable storage medium of claim 16, wherein the computer program is further executed by the processor to:

determine a target interference frequency list corresponding to the first MIPI operating frequency according to a correspondence between MIPI operating frequencies and interference frequency lists, wherein the target interference frequency list contains a plurality of first interference frequencies corresponding to the first MIPI operating frequency; and compare the target operating frequency sequentially with the plurality of first interference frequencies in the target interference frequency list, and determine that the target operating frequency is interfered when the target operating frequency is matched with any one of the plurality of first interference frequencies.

* * * * *